(12) United States Patent
Harlan et al.

(10) Patent No.: US 11,023,927 B2
(45) Date of Patent: Jun. 1, 2021

(54) SYSTEM AND METHOD FOR LOCATION-BASED ADVERTISEMENT DELIVERY VERIFICATION

(71) Applicant: MobileFuse LLC, New York, NY (US)

(72) Inventors: Kenneth Harlan, Princeton, NJ (US); Elizabeth Renfer, Boston, MA (US); Israel Alvarez, Milton, MA (US); Dan Barnett, Verona, WI (US)

(73) Assignee: MOBILEFUSE LLC, New York, NY (US)

( * ) Notice: Subject to any disclaimer, the term of this patent is extended or adjusted under 35 U.S.C. 154(b) by 305 days.

(21) Appl. No.: 16/285,889

(22) Filed: Feb. 26, 2019

(65) Prior Publication Data

US 2019/0266640 A1 Aug. 29, 2019

Related U.S. Application Data

(60) Provisional application No. 62/635,099, filed on Feb. 26, 2018.

(51) Int. Cl.
| | |
|---|---|
| *G06Q 30/00* | (2012.01) |
| *G06Q 30/02* | (2012.01) |
| *H04W 4/029* | (2018.01) |

(52) U.S. Cl.
CPC ..... *G06Q 30/0261* (2013.01); *G06Q 30/0246* (2013.01); *G06Q 30/0247* (2013.01); *G06Q 30/0248* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 7,496,191 B1* | 2/2009 | Crews | G06F 21/6218 379/142.02 |
| 7,853,786 B1* | 12/2010 | Fultz | H04W 4/02 713/166 |

(Continued)

OTHER PUBLICATIONS

Ulmer, Alex, et al. "Visual-Interactive Identification of Anomalous IP-Block Behavior Using Geo-IP Data." IEEE Explore, Technische Universitat Darmstadt, Germany, 2018. (Year: 2018).*

*Primary Examiner* — Luis A Brown
(74) *Attorney, Agent, or Firm* — Carter, DeLuca & Farrell LLP; George Likourezos (57) ABSTRACT

A system and method for enhanced location verification and content delivery confirmation including building a customized pixel for location verification, appending the customized pixel to an ad tag, collecting a combination of data from the pixel, holding the combination of data collected and grouping the held data, and processing the combination of data collected from a previous day by performing a first enrichment process including enriching the combination of data with additional data corresponding to at least one of connection type and latitude and longitude data, wherein latitude and longitude data is based on IP in a case where latitude and longitude information was not provided. The method further includes performing a second enrichment process including enriching the combination of data with location data fields, calculating and assigning a location quality score to the enriched data based on an accuracy or in-geo, a precision or credibility, and a confidence of location data, and aggregating the enriched data and storing the enriched data in a database.

20 Claims, 8 Drawing Sheets

(56) References Cited

U.S. PATENT DOCUMENTS

| | | | |
|---|---|---|---|
| 7,873,534 B2* | 1/2011 | Simons | G06Q 30/02 705/7.29 |
| 8,326,767 B1* | 12/2012 | Ramanujan | H04L 67/2809 705/78 |
| 8,332,535 B2* | 12/2012 | Dingier | H04W 12/02 709/238 |
| 8,428,867 B2* | 4/2013 | Ashley, Jr. | G01S 13/878 701/408 |
| 8,583,482 B2 | 11/2013 | Netzer et al. | |
| 9,282,446 B2 | 3/2016 | Moshfeghi | |
| 2005/0177416 A1 | 8/2005 | Linden | |
| 2006/0022048 A1* | 2/2006 | Johnson | H04L 67/04 235/462.1 |
| 2006/0212299 A1* | 9/2006 | Law | G06F 16/25 715/748 |
| 2007/0162341 A1* | 7/2007 | McConnell | G06Q 30/0267 705/14.38 |
| 2007/0262860 A1* | 11/2007 | Salinas | H04W 4/02 340/539.12 |
| 2008/0052276 A1* | 2/2008 | Tzamaloukas | G06Q 30/02 |
| 2008/0059424 A1* | 3/2008 | Tzamaloukas | G06Q 30/02 |
| 2008/0139181 A1 | 6/2008 | Lokshin | |
| 2008/0235288 A1* | 9/2008 | Ben Harush | G06F 16/217 |
| 2009/0031006 A1* | 1/2009 | Johnson | H04W 4/14 709/218 |
| 2009/0216642 A1* | 8/2009 | Ho | G06F 16/958 705/14.25 |
| 2010/0161378 A1* | 6/2010 | Josifovski | G06Q 30/0243 705/14.42 |
| 2010/0205213 A1* | 8/2010 | Broder | G06F 16/24539 707/780 |
| 2010/0205628 A1* | 8/2010 | Davis | H04N 21/41265 725/25 |
| 2011/0231233 A1* | 9/2011 | Iannace | G06Q 30/0224 705/14.13 |
| 2012/0036034 A1* | 2/2012 | Golden | G06Q 30/0205 705/26.3 |
| 2012/0179549 A1* | 7/2012 | Sigmund | G06Q 30/0261 705/14.58 |
| 2012/0278171 A1* | 11/2012 | Tang | G06F 16/9537 705/14.57 |
| 2012/0290389 A1* | 11/2012 | Greenough | G06Q 20/3224 705/14.53 |
| 2013/0053057 A1* | 2/2013 | Cansino | H04N 21/454 455/456.1 |
| 2013/0060633 A1* | 3/2013 | St-Pierre | G06Q 30/0251 705/14.58 |
| 2013/0090130 A1* | 4/2013 | Burrell | H04W 4/21 455/456.1 |
| 2013/0091016 A1* | 4/2013 | Shutter | G06Q 30/02 705/14.58 |
| 2013/0132993 A1* | 5/2013 | Huchital | H04H 60/51 725/22 |
| 2013/0138508 A1* | 5/2013 | Gee | H04N 21/42202 705/14.58 |
| 2013/0144717 A1* | 6/2013 | Williams | H04W 4/02 705/14.53 |
| 2013/0290643 A1* | 10/2013 | Lim | G06F 16/2255 711/144 |
| 2013/0317944 A1* | 11/2013 | Huang | G06Q 30/0623 705/26.61 |
| 2014/0032326 A1* | 1/2014 | Li | G06Q 30/0267 705/14.58 |
| 2016/0034961 A1* | 2/2016 | May | G06Q 30/0261 705/14.58 |
| 2016/0044467 A1* | 2/2016 | Clausen | H04W 4/021 455/457 |
| 2016/0066151 A1* | 3/2016 | Palanki | G01S 5/0252 455/456.1 |
| 2016/0171540 A1* | 6/2016 | Mangipudi | G06Q 30/0255 705/14.53 |
| 2017/0230791 A1* | 8/2017 | Jones | H04L 61/609 |
| 2018/0025603 A1* | 1/2018 | Tyler | G06Q 10/0833 340/572.1 |
| 2019/0266640 A1* | 8/2019 | Harlan | G06Q 30/0247 |

\* cited by examiner

| | Location Derivative | In-Geo Verification | In-Geo Ad Blocking | Geo Precision Score | Lat/Long Quality Score | POI Verification | Brand Location Data | Census Location Data |
|---|---|---|---|---|---|---|---|---|
| MFI | IP & Lat/Long | ✓ | ✗ | ✓ | ✓ | ✓ | ✓ | ✓ |
| Double Verify | IP | ✓ | ✓ | ✗ | ✗ | ✗ | ✗ | ✗ |
| IAS | IP | ✓ | ✓ | ✗ | ✗ | ✗ | ✗ | ✗ |
| Moat | IP | ✓ | ✗ | ✗ | ✗ | ✗ | ✗ | ✗ |
| Placecast | Carrier Data | ✓ | ✗ | ✗ | ✗ | ✗ | ✗ | ✗ |

Columns: 301, 303, 305, 307, 309, 311, 313

FIG. 3A

| Supply Partner | Total Records | Passed Lat/Long | Passed WiFi IP | In-Geo | Accuracy | Precision | Confidence | Location Quality Score ("LQS") |
|---|---|---|---|---|---|---|---|---|
| Exchange #1 | 22,231 | 85% | 10% | 98% | 95% | 21% | 88% | 68 |
| Exchange #2 | 22,280 | 44% | 11% | 100% | 55% | 81% | 64% | 67 |
| Exchange #3 | 23,365 | 72% | 2% | 75% | 74% | 57% | 70% | 67 |
| Exchange #4 | 1,339,417 | 93% | 1% | 96% | 94% | 87% | 91% | 91 |
| Totals | 1,407,293 | 92% | 1% | 96% | 93% | 85% | 90% | 89 |

FIG. 3B

|  | Location Derivative | In-Geo Verification | In-Geo Ad Blocking | Location Fraud Analysis | Signal Confidence Rating | POI Verification |
|---|---|---|---|---|---|---|
| MFI | IP & Lat/Long | ✓ | ✗ | ✓ | ✓ | ✓ |
| Double Verify | IP | ✓ | ✓ | ✗ | ✗ | ✗ |
| IAS | IP | ✓ | ✓ | ✗ | ✗ | ✗ |
| MOAT | IP | ✓ | ✗ | ✗ | ✗ | ✗ |
| Placecast | Carrier Data | ✓ | ✗ | ✗ | ✗ | ✗ |

FIG. 3C

| Supply Partner | Total Impressions | Passed Lat/Lon | Passed Non Cellular IP | Passed Cellular IP | In-Geo | Credibility | Confidence | Location Quality Score |
|---|---|---|---|---|---|---|---|---|
| Exchange #1 | 22,231 | 85% | 10% | 5% | 98% | 21% | 88% | 68 |
| Exchange #2 | 22,280 | 44% | 11% | 45% | 100% | 81% | 64% | 67 |
| Exchange #3 | 23,365 | 72% | 2% | 26% | 75% | 57% | 70% | 67 |
| Exchange #4 | 1,339,417 | 93% | 1% | 6% | 96% | 87% | 91% | 90 |
| Totals | 1,407,293 | 92% | 1% | 7% | 96% | 85% | 90% | 90 |

DEMOGRAPHIC BREAKDOWN

500

| Population Density | |
|---|---:|
| Urban | 96% |
| Suburban | 3% |
| Rural | 1% |

Household Income

| | 3% < $50K | 19% $50K-$75K | 37% $75K-$100K | 22% $100K-$150K | 15% $150K-$200K | 4% > $200K |

501→

Ethnicity

- Other 8%
- 23% African American
- Hispanic 22%
- 14% Asian
- Caucasian 33%

| Voting Affiliation | | |
|---|---|---:|
| 🐴 | Democrat | 21% |
| ☆ | Independent | 7% |
| 🐘 | Republican | 19% |
| ✳ | Unknown | 53% |

503→

SUPPLY QUALITY

Top Delivering Supply Partners
Distribution of impression delivery across top five supply partners.

| | |
|---|---:|
| Partner #1 | 21% |
| Partner #2 | 19% |
| Partner #3 | 24% |
| Partner #4 | 15% |
| Partner #5 | 12% |

Delivery Inside Geotargeting Boundaries
Percentage of impressions delivered within geotargeting boundaries.

| | |
|---|---:|
| Partner #1 | 99% |
| Partner #2 | 100% |
| Partner #3 | 71% |
| Partner #4 | 89% |
| Partner #5 | 97% |

Accuracy Breakdown
Evaluation of location data derivative and percentage of the total impression delivery.

| | GPS Lat/Lon | Wifi-based IP |
|---|---:|---:|
| Partner #1 | 65% | 22% |
| Partner #2 | 20% | 5% |
| Partner #3 | 31% | 21% |
| Partner #4 | 79% | 10% |
| Partner #5 | 22% | 62% |

Precision Breakdown
Evaluation of location datas exactness and percentage of total impression delivery.

| | Inadequate | 11 meters | 1.1 meters | 0.11 meters |
|---|---:|---:|---:|---:|
| Partner #1 | 82% | 7% | 1% | 0% |
| Partner #2 | 22% | 69% | 4% | 5% |
| Partner #3 | 10% | 31% | 41% | 8% |
| Partner #4 | 61% | 22% | 11% | 6% |
| Partner #5 | 30% | 63% | 4% | 3% |

Location Quality Score
Evaluation of a partner's overall supply quality based on the accuracy, precision, and confidence of their location data.

| | Accuracy | Precision | Confidence | Location Quality Score |
|---|---:|---:|---:|---:|
| Partner #1 | 87% | 18% | 79% | 61 |
| Partner #2 | 25% | 78% | 66% | 56 |
| Partner #3 | 52% | 39% | 81% | 57 |
| Partner #4 | 89% | 90% | 92% | 90 |
| Partner #5 | 84% | 90% | 31% | 68 |

FIG. 5A

GEOGRAPHIC TARGETING — 510

511 →

| Country | |
|---|---|
| USA | 97% |
| Canada | 1% |
| Mexico | 1% |
| Other | 1% |

| DMA | |
|---|---|
| New York, NY | 65% |
| Boston, MA | 12% |
| Springfield, MA | 9% |
| Providence, RI | 8% |
| Other | 6% |

| State | |
|---|---|
| New York | 75% |
| Massachusetts | 10% |
| Connecticut | 5% |
| Rhode Island | 6% |
| Other | 4% |

Zip Code: 21% 10016 | 18% 10065 | 11% 02127 | 5% 02560 | 45% Other

City: 17% New York, NY | 12% Boston, MA | 7% Springfield, MA | 5% Albany, NY | 59% Other

513 →

POINT OF INTEREST DATA

| Top Delivering Location Categories | |
|---|---|
| Top aggregated geo feature categories with the highest concentration of delivery. | |
| Food & Beverage | 71% |
| Leisure & Entertainment | 12% |
| Shopping & Retail | 9% |
| Sports & Recreation | 3% |
| Education | 1% |

| Top Delivering Points of Interest | |
|---|---|
| Specific geographic features with the highest concentration of delivery. | |
| Restaurants | 17% |
| Nightlife Venues | 14% |
| Stadiums & Arenas | 11% |
| Food & Drink Shop | 6% |
| Malls | 6% |

| Top Delivering Brand Locations | |
|---|---|
| Specific brick-and-mortar brand locations with the highest concentration of delivery. | |
| McDonalds | 17% |
| Panera Bread | 14% |
| Red Lobster | 11% |
| Buffalo Wild Wings | 6% |
| Bonefish Grill | 6% |

SYSTEM AND METHOD FOR LOCATION-BASED ADVERTISEMENT DELIVERY VERIFICATION

CROSS-REFERENCE TO RELATED APPLICATIONS

The present application claims the benefit of and priority to U.S. Provisional Patent Application Ser. No. 62/635,099, filed on Feb. 26, 2018, the entire contents of which are hereby incorporated by reference herein.

BACKGROUND

Technical Field

The present disclosure relates to a system and a method for automatic monitoring and verification of advertising content, delivered over a data network, the world-wide-web, and other forms of Internet-based media. In particular, the present disclosure is directed to a system and method for optimizing and verifying the delivery location of media/advertising content delivered to computing devices such as mobile phones.

Description of Related Art

Today's mobile advertisers know it is crucial for campaigns to deliver within geographical targets. Successful advertising and delivery demand accurate and precise location data.

In 2017, approximately $16 billion of total ad spending included location targeting for advertisement content delivery. Currently, a majority of location data used for delivery of advertisement content is inaccurate leading to a significant amount of waste. The need to accurately evaluate the quality of location data for advertisement content delivery has never been greater.

SUMMARY

The present disclosure is directed to optimizing and verifying location data in connection with location based advertising content. In particular, the system and methods described herein go beyond verification by providing unique context for a location signal via enriched data. In on example, by focusing on GPS-enabled lat/lon data, rather than IP or carrier data, the system described herein is not limited to city level areas, allowing for more precise reporting and a granular view into the reach of advertisement campaigns. The system according to the present disclosure performs fraudulent location data checks, confirms that advertisement content reaches a desired target, when it was intended to reach the target, and at a location in which the content is supposed to reach the target. The GPS lat/lon data signals provide accurate and precise location data and may be used in conjunction with other data and determinations by the system to eliminate fraud and optimize and verify ad content delivery.

Additionally, the system provides insightful data to learn where advertising content is viewed, to better understand the audience, and uncovers location categories and brand insights by point of interest. The system also enables and performs an evaluation of inventory partnerships by location signal quality and optimization impression distribution based on location strength to maximize spend. In an aspect, the system enables and performs an evaluation of inventory partnerships by location signal quality, providing optimized impression distribution data on location strength to maximize ad spend. As will be described in greater detail below, the system determines if an impression was served within specified geo-targeted locations, analyzing various data points to assign a location quality score, and reports the findings to users.

In an aspect of the present disclosure, a method for enhanced location verification and content delivery confirmation is provided. The method includes building a customized pixel for location verification, appending the customized pixel to an ad tag, collecting a combination of data from the pixel, the combination of data including location data, holding the combination of data collected and grouping the held data into files, and processing the combination of data collected from a previous day by performing a first enrichment process. The first enrichment process includes enriching the combination of data with additional data corresponding to at least one of connection type, ISP, or lat/lon data based on IP in a case where lat/lon data was not otherwise provided by other means. In an aspect, the first enrichment process includes enriching the combination of data with the connection type based on IP and the latitude and longitude if such information was not directly provided. The method further includes performing a second enrichment process including enriching the combination of data with location data fields including at least one of country, zip, or designated market area. In an aspect, the location data fields may further include brand category, state, city, income, population density, ethnicity, location category, address, or political affiliation. The method further includes calculating and/or assigning a location quality score to the enriched data based on an accuracy or in-geo, a precision or credibility, and a confidence of location data, aggregating the enriched data, storing the enriched data in a database, generating a daily report for all pixels based on the enriched data stored in the database, and delivering the generated daily report to a client.

In an aspect, the first enrichment process further includes fixing a timestamp format, converting to CSV, and storing a log. The accuracy or in-geo of the location quality score may be based on at least one of a type of location signal or whether a location signal matches an intended geotarget. Additionally, or alternatively, the precision or credibility of the location quality score is based on at least one of an exactness of the location signal or a probability of fraudulent activity. The confidence of the location quality score may be based on at least one of a reliability of targeting and non-fraudulent data or a reliability of a location signal's capability to properly target a defined area.

In an aspect, the in-geo portion of the location quality score compares a location signal to the intended geotargeted area of an ad campaign. Additionally, or alternatively, the credibility of the location quality score is based on the frequency of fraudulent location signal data present in an ad call. The confidence of the location quality score may be based on how location signals aligns with an advertising campaign's geotargeting specifications.

The method may further include generating a daily optimization report including a breakdown of the location quality score by partner and publisher and performance indicators to provide engagement data correlated to location signals. Additionally, or alternatively, the method may further include generating a weekly geographic report including a breakdown of geographic delivery and performance by partner and optimizable data for shifting a budget towards better performing locations. Additionally, or alternatively, the method may further include generating a final insight report including a full campaign breakdown of geographic distribution, Pitney Bowes POI data, census demographic insights, and supply partnership evaluations. Additionally, or alternatively, the method may further include generating a weekly insight report including a breakdown of the geographic ad impression delivery distribution for the prior seven days, aggregated as a total and additional broken down by supply partner for individual evaluations.

In yet another aspect of the present disclosure, a system for enhanced location verification and content delivery confirmation is provided. The system, or a computing device of the system, is configured to build a customized pixel for location verification, append the customized pixel to an ad tag, collect a combination of data from the pixel, the combination of data including location data, hold the combination of data collected and grouping the held data into files, and process the combination of data collected from a previous day by performing a first enrichment process. The first enrichment process includes enriching the combination of data with additional data corresponding to at least one of connection type, ISP, or lat/lon data based on IP in a case where lat/lon data was not provided by other means. In an aspect, the first enrichment process includes enriching the combination of data with the connection type based on IP and the latitude and longitude if such information was not directly provided. The system, or a computing device of the system, is further configured to perform a second enrichment process including enriching the combination of data with location data fields including at least one of country, zip, or designated market area. In an aspect, the location data fields may further include brand category, state, city, income, population density, ethnicity, location category, address, or political affiliation. The system is further configured to calculate and assign a location quality score to the enriched data based on an accuracy or in-geo, a precision or credibility, and a confidence of location data, aggregate the enriched data and store the enriched data in a database, generate a daily report for all pixels based on the enriched data stored in the database, and deliver the generated daily report to a client.

In an aspect, the first enrichment process further includes fixing a timestamp format, converting to CSV, and storing a log. The accuracy or in-geo of the location quality score may be based on at least one of a type of location signal or whether a location signal matches an intended geotarget. Additionally, or alternatively, the precision or credibility of the location quality score is based on at least one of an exactness of the location signal or a probability of fraudulent activity. The confidence of the location quality score may be based on at least one of a reliability of targeting and non-fraudulent data or a reliability of a location signal's capability to properly target a defined area.

In an aspect, the in-geo portion of the location quality score compares a location signal to the intended geotargeted area of an ad campaign. Additionally, or alternatively, the credibility of the location quality score is based on the frequency of fraudulent location signal data present in an ad call. The confidence of the location quality score may be based on how location signals aligns with an advertising campaign's geotargeting specifications.

In an aspect, the computing device is further configured to generate a daily optimization report including a breakdown of the location quality score by partner and publisher and performance indicators to provide engagement data correlated to location signals. Additionally, or alternatively, the computing device is further configured to generate a weekly geographic report including a breakdown of geographic delivery and performance by partner and optimizable data for shifting a budget towards better performing locations. In an aspect, the computing device is further configured to generate a final insight report including a full campaign breakdown of geographic distribution, Pitney Bowes POI data, census demographic insights, and supply partnership evaluations. Additionally, or alternatively, the system may further be configured to generate a weekly insight report including a breakdown of the geographic ad impression delivery distribution for the prior seven days, aggregated as a total and additional broken down by supply partner for individual evaluations.

In yet another aspect of the present disclosure, a non-transitory computer-readable storage medium storing a program which, when executed by a computer, causes the computer to perform a method for enhanced location verification and content delivery confirmation is provided. The method performed includes building a customized pixel for location verification, appending the customized pixel to an ad tag, collecting a combination of data from the pixel, the combination of data including location data, holding the combination of data collected and grouping the held data into files, and processing the combination of data collected from a previous day by performing a first enrichment process. The first enrichment process includes enriching the combination of data with additional data corresponding to at least one of connection type, ISP, or lat/lon data based on IP in a case where lat/lon data was not provided by other means. In an aspect, the first enrichment process includes enriching the combination of data with the connection type based on IP and the latitude and longitude if such information was not directly provided. The method further includes performing a second enrichment process including enriching the combination of data with location data fields including at least one of country, zip, or designated market area. In an aspect, the location data fields may include brand category, state, city, income, population density, ethnicity, location category, address, or political affiliation. The method further includes calculating and assigning a location quality score to the enriched data based on an accuracy or in-geo, a precision or credibility, and a confidence of location data, aggregating the enriched data and storing the enriched data in a database, generating a daily report for all pixels based on the enriched data stored in the database, and delivering the generated daily report to a client.

In an aspect, the first enrichment process further includes fixing a timestamp format, converting to CSV, and storing a log. The accuracy or in-geo of the location quality score may be based on at least one of a type of location signal or whether a location signal matches an intended geotarget. Additionally, or alternatively, the precision or credibility of the location quality score is based on at least one of an exactness of the location signal or a probability of fraudulent activity. The confidence of the location quality score may be based on at least one of a reliability of targeting and non-fraudulent data or a reliability of a location signal's capability to properly target a defined area.

In an aspect, the in-geo portion of the location quality score compares a location signal to the intended geotargeted area of an ad campaign. Additionally, or alternatively, the credibility of the location quality score is based on the frequency of fraudulent location signal data present in an ad call. The confidence of the location quality score may be based on how location signals aligns with an advertising campaign's geotargeting specifications.

The method may further include generating a daily optimization report including a breakdown of the location quality score by partner and publisher and performance indicators to provide engagement data correlated to location signals. Additionally, or alternatively, the method may further include generating a weekly geographic report including a breakdown of geographic delivery and performance by partner and optimizable data for shifting a budget towards better performing locations. Additionally, or alternatively, the method may further include generating a final insight report including a full campaign breakdown of geographic distribution, Pitney Bowes POI data, census demographic insights, and supply partnership evaluations. Additionally, or alternatively, the method may further include generating a weekly insight report including a breakdown of the geographic ad impression delivery distribution for the prior seven days, aggregated as a total and additional broken down by supply partner for individual evaluations.

BRIEF DESCRIPTION OF THE DRAWINGS

Various aspects and features of the present disclosure are described hereinbelow with references to the drawings, wherein.

DETAILED DESCRIPTION

As described briefly above, and as will be described in greater detail below, the present disclosure is directed to verifying and optimizing location data in connection with location based advertising content. In particular, the system and methods described herein provide unique context for a location signal via enriched data. In an aspect, for example, by focusing on GPS-enabled lat/lon data, rather than IP or carrier data, the system described herein is not limited to city level areas, allowing for more precise reporting and a granular view into the reach of advertisement campaigns. The system confirms that advertisement content reaches a desired target, when it was intended to reach the target, and at a location in which the content is supposed to reach the target. The GPS lat/lon data signals provide accurate and precise location data and may be used in conjunction with other data and determinations by the system to detect fraud and optimize and verify ad content delivery.

Additionally, the system provides insightful data to learn where advertising content is viewed, to better understand the audience, and uncovers location categories and brand insights by point of interest. For example, the system provides insightful data to learn the source of the location signal and trustworthiness of the location signal. The system also enables and performs an evaluation of inventory partnerships by location signal quality and optimization impression distribution based on location strength to maximize spend. As will be described in greater detail below, the system determines if an impression was served within specified geo-targeted locations, analyzing various data points to calculate and assign a location quality score, and reports the findings to users.

Figure 1:
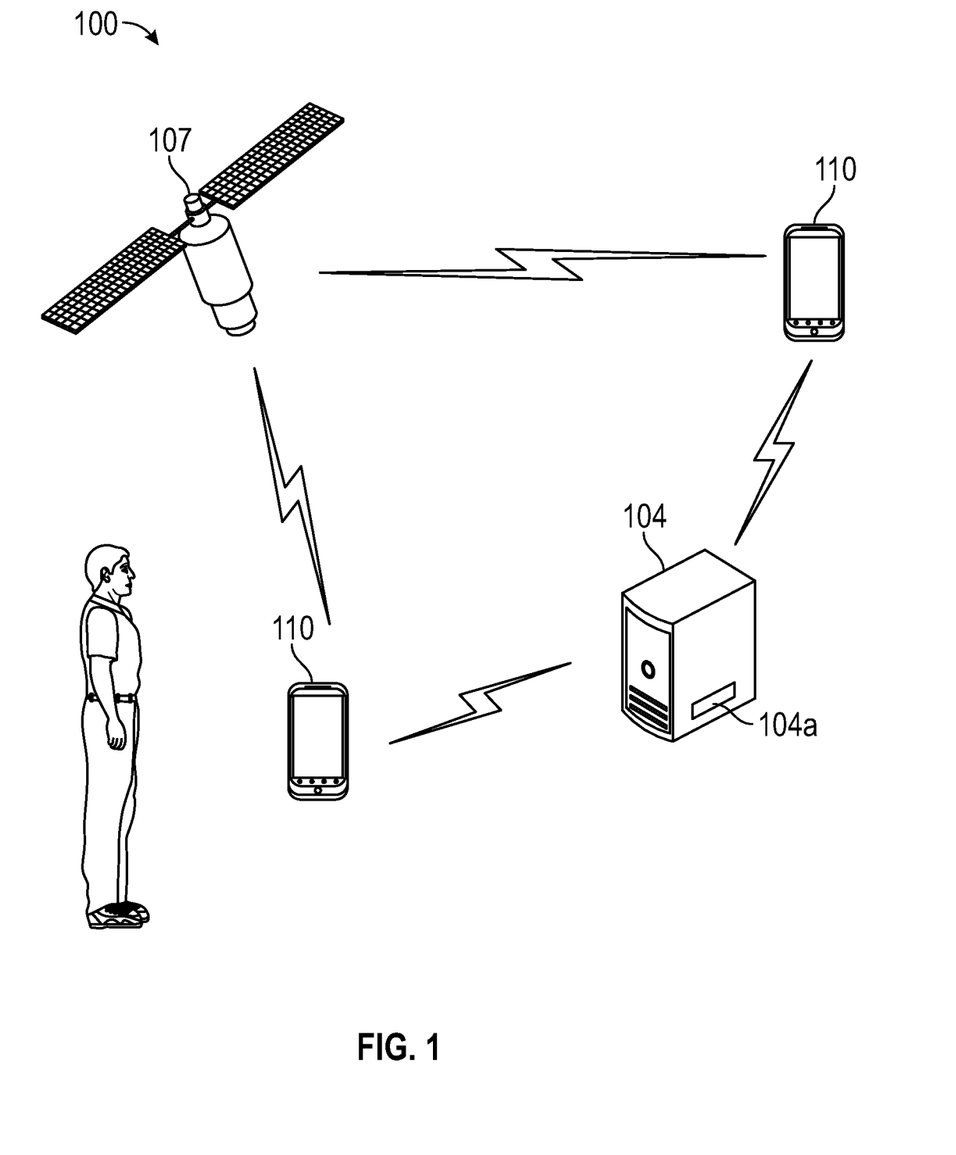
FIG. 1 is a schematic illustration of the components of a system for enhanced location verification and content delivery confirmation in accordance with an aspect of the present disclosure.

FIG. 1 illustrates an example system 100 for enhanced location verification and content delivery confirmation, according to certain embodiments of the present disclosure. System 100 includes one or more remote devices 110 that are communicatively coupled to one or more data collection servers 104 and one or more location units 107.

Remote devices 110 are communicatively coupled to location unit 107 and data collection server 104. Location unit 107 may be any device capable of being used in conjunction with the remote devices 110 for determining the location of the remote devices 110. In particular, in one aspect, one or more location units 107 transmit signals to the remote device 110 which enables the remote device 110 and/or data collection server 104 to calculate the location or position of the remote device 110 at a given point in time. In some embodiments, system 100 includes multiple location units 107 that are used in conjunction with a remote device 110 to determine the location of the remote device 110 via triangulation as is known in the art. In other embodiments, system 100 may include a combination of different types of location units 107. For example, system 100 may utilize GPS satellites, RFID, NFC, Wi-Fi, IP, and/or cellular signals to determine the location of each of the mobile remote devices 110. Additionally, the location of remote devices 110 may be assigned to the remote device 110 based on its proximity to other components.

Remote devices 110 are used for ad content delivery and display. Content is targeted to a specific user's remote device 110 based on a variety of factors including specifics of the user and the location of the remote device 110 at a given point in time. To this end, remote devices 110 are capable of displaying graphical user interfaces including ad content. Additionally, remote devices 110 communicate with data collection server 104, for example to receive ad content, ad content delivery instructions, and other data, and to transmit ad content viewing data including location data and other data to data collection server 104.

Data collection server 104 includes one or more electronic computing devices operable to receive, transmit, process, and store data associated with system 100, in particular, the location data and movement data of the remote devices 110. Data collection server 104 uses any suitable operating system, as would be understood by those of skill in the art. Although a single data collection server is illustrated, the present disclosure contemplates system 100 including any suitable number of data collection servers 104. Moreover, although referred to as a data collection server, the present disclosure contemplates data collection server 104 comprising any suitable type of processing device or devices, and the terms data collection server and computing device are used interchangeably herein.

Data collection server 104 may be configured to deliver ad content, ad content delivery instructions, or other data to remote devices 110, and may additionally be configured to receive data from remote devices 110 and process the received data to optimize and verify ad content delivery, and to generate and deliver reports as described in greater detail below.

Data collection server 104 includes a database 104a which stores all data received from the remote devices 110. In particular, database 104a stores data corresponding to mapping boundaries defined by a remote device 110, maps that were built by the remote devices 110, maps that are built and uploaded by third-parties, and continuous location data and movement data of the remote devices 110. Data collection server 104 is configured to process the location data and movement data of the remote device(s) 110 to deliver targeted ad content to the remote device 110 based on data stored in database 104a, user parameters, and location data. In particular, in one embodiment, data collection server 104 receives the location data and movement data of the remote devices 110 and stores the data in a database 104a. The software resident on the data collection server 104 processes the collected data stored in the database 104a to perform some or all of the steps of the methods described below (e.g., method 400 of FIG. 4).

Figure 2:
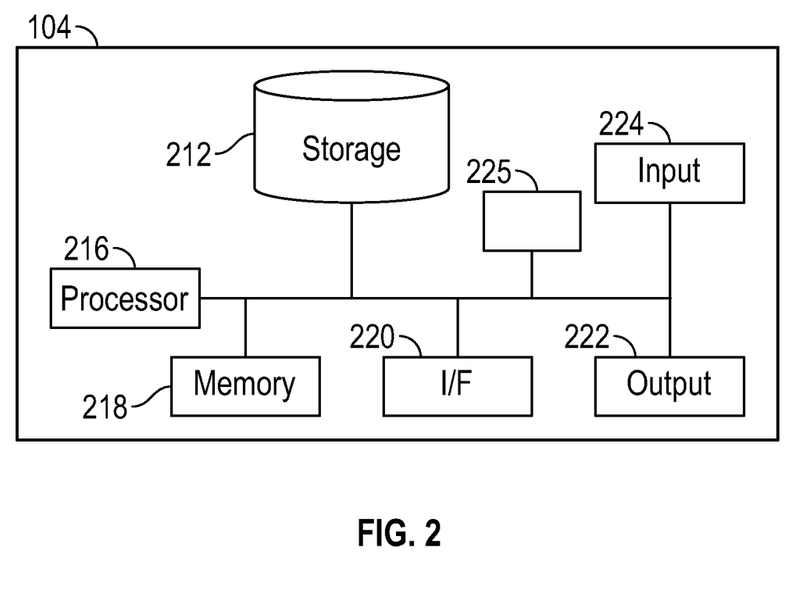
FIG. 2 is a schematic illustration of the components of a data collection server of the system illustrated in FIG. 1.

Continuing with reference to FIG. 2, storage device 212 is similar to database 104a and may include any suitable device operable for storing data and instructions. Storage device 212 includes, for example, Random Access Memory (RAM) or Read Only Memory (ROM), EEPROM, a magnetic disk, flash memory, optical disk, or other suitable data storage device.

Memory 218 and/or storage 212 may include software or instructions that when executed by the processor 216 cause the processor 216 to calculate the location of the remote device 110. Examples of the instructions may include a thick client such as a native application that runs on the remote device 110 and which receives data from the data collection server 104 and conducts its own processing and data manipulation. Alternatively, the instructions may be a thin client interface enabling display of data received from data collection server 104, and all processing and data manipulation occurs at the data collection server 104 and is made available via a browser such as Mozilla (Firefox), Internet Explorer, Google Chrome, Safari or any other current or future browsers.

Processor 216 includes any suitable device operable to execute instructions and manipulate data to perform operations. Processor 216 may include, for example, any type of central processing unit (CPU). Memory 218 includes any computer memory (for example, Random Access Memory (RAM) or Read Only Memory (ROM)), mass storage media (for example, a hard disk), removable storage media, database and/or network storage (for example, a server). Memory 218 may comprise any other computer-readable tangible medium, or a combination of any of the preceding.

I/F 220 includes any suitable device operable to receive input, send output, perform suitable processing of the input or output or both, communicate to other devices, such as remote devices 110, location unit 107, and/or other data collection servers 104, or any combination of the preceding. I/F 220 may include appropriate hardware (for example, a modem, network interface card, etc.) and software, including protocol conversion and data processing capabilities, to communicate through a LAN, WAN, or other communication system that enables communication between data collection server 104 with other data collection servers 104, remote devices 110 and other devices and components.

Output device 222 includes any suitable device operable for displaying information to a user, for example in the form of a GUI, which may be displayed on data collection server 104 and/or remote devices 110. Output device 222 may include, for example, a touch screen, a video display, a printer, a plotter, or other suitable output device. Input device 224 includes any suitable device operable to input, select, and/or manipulate various data and information. Input device 224 may include, for example, a touch screen, a keyboard, mouse, graphics tablet, joystick, light pen, microphone, scanner, or other suitable input device.

Location data generator 225 includes any suitable device for receiving signals from location unit 107 (FIG. 1), remote devices 110, components of system 100, or other non-components of system which are used for calculating values associated with the location data of remote devices 110. For example, in certain embodiments, location data generator 225 receives location data derived from cellular networks, IP, Wi-Fi, near field communications, or any other such means.

Although the components described above ad illustrated in FIG. 2 are described and illustrated as being components of data collection server 104, it is understood that any or all of the components may additionally, or alternatively, be components of remote devices 110, a specific description and illustration of which is not explicitly provided herein for brevity.

Referring now to FIGS. 3A-3D, and with continued reference to FIG. 1, system 100 accounts for, and considers, at least one of the following factors: a location derivative 301 (e.g., IP, lat/lon data), in geo-verification 303, geo precision or credibility score 305, a calculated lat/long quality score 307, a POI verification 309, brand location data 311, and/or census location data 313.

Figure 3A:
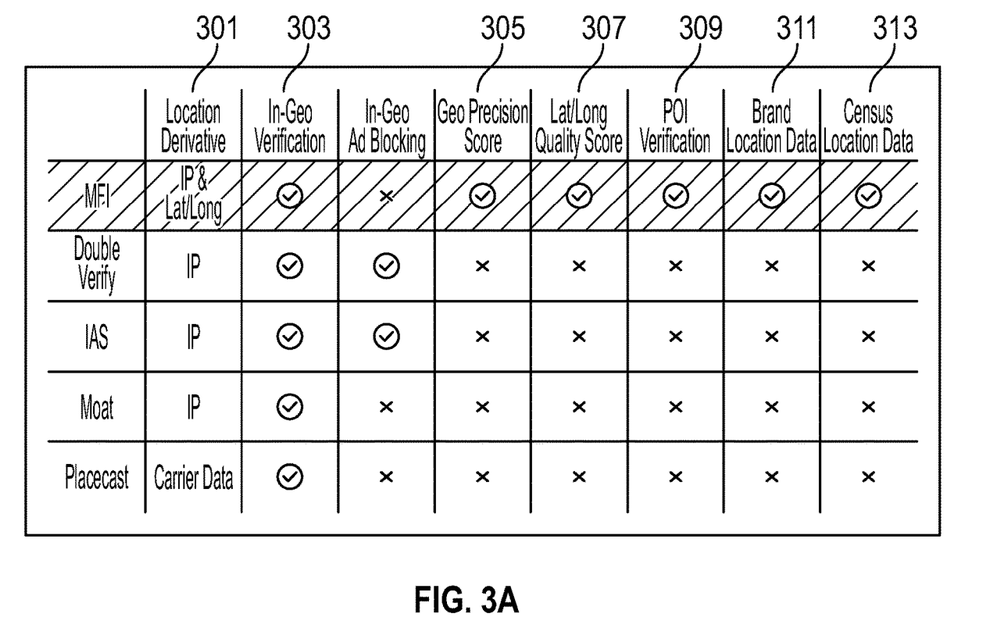
FIG. 3A is a sample chart illustrating exemplary benefits of the system and factors considered by the system of FIG. 1.
Figure 3B:
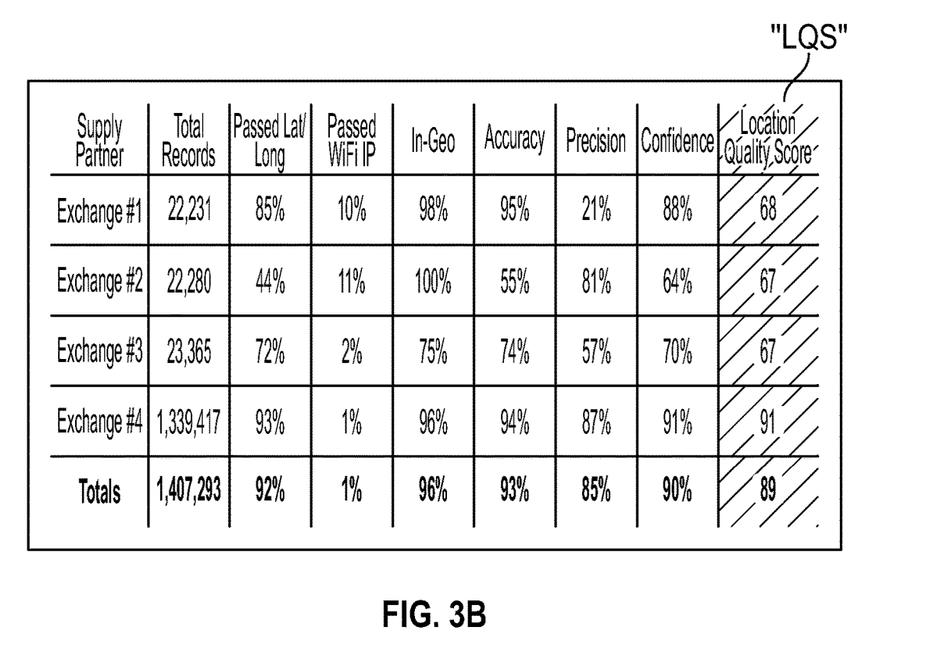
FIG. 3B is a sample chart illustrating exemplary location quality scores generated by the system of FIG. 1.
Figure 3C:
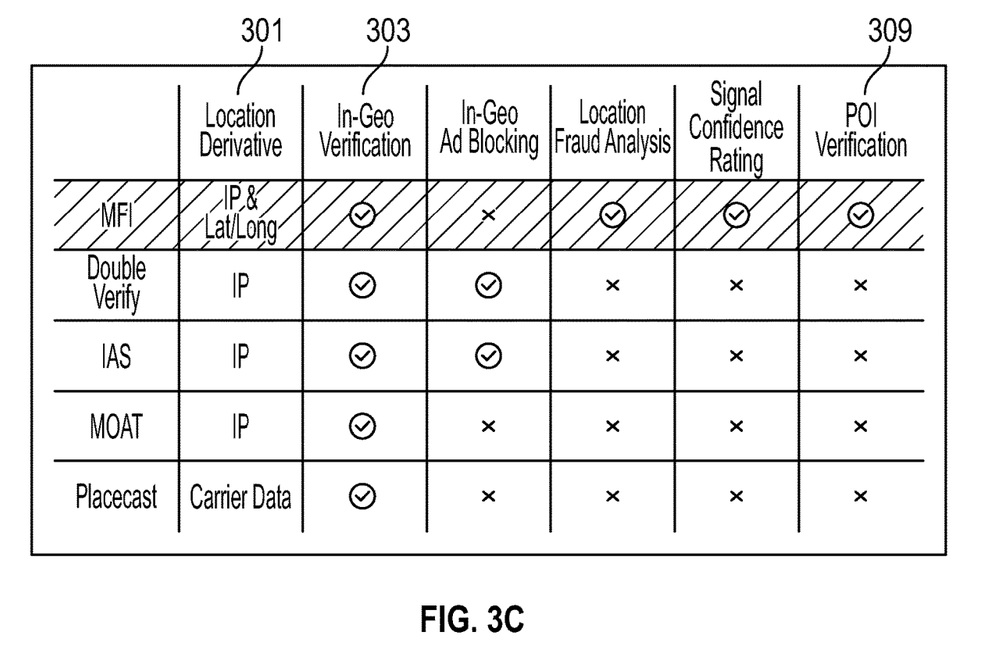
FIG. 3C is a sample chart illustrating exemplary benefits of the system and factors considered by the system of FIG. 1.
Figure 3D:
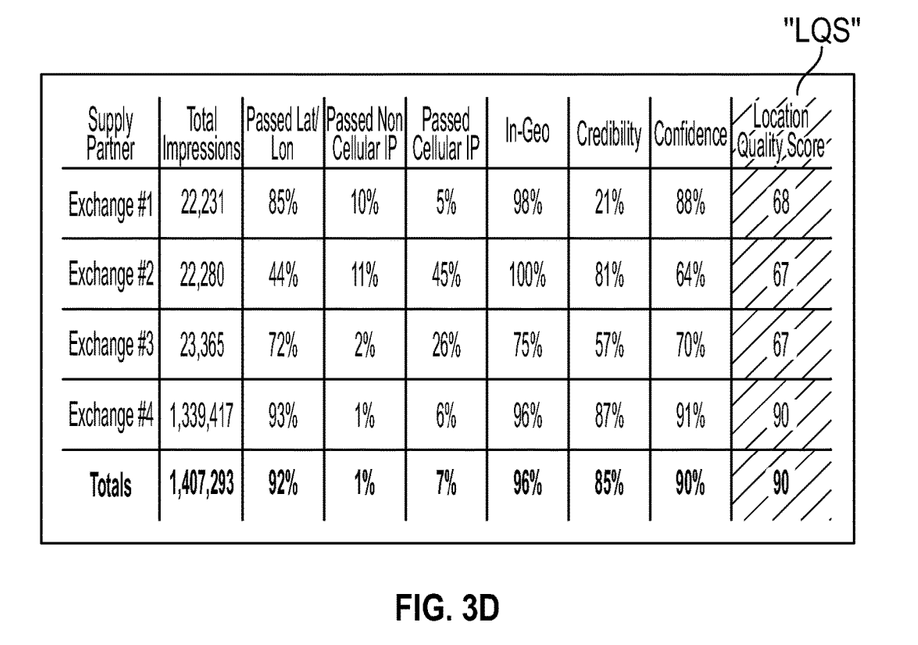
FIG. 3D is a sample chart illustrating exemplary location quality scores generated by the system of FIG. 1.

FIG. 3B illustrates a value representing the accuracy or in-geo of the data (e.g., signal), a value representing the precision or credibility of the data (e.g., signal), a value representing the confidence of the data (e.g., signal), and a location quality score "LQS", each of which is calculated by system 100. Additionally, FIG. 3B illustrates passed lat/lon which is representative of where lat/lon is explicitly passed, passed Wi-Fi-based IP, which is representative of where IP indicated a Wi-Fi connection, and in Geo which is representative of being within specified geotargeting.

The value representing the accuracy or in-geo of the signal is determined based on a measure of the location signal type, for example, where lat/lon data is supplied or noncellular IP is supplied. In an aspect, the value representing in-geo is determined based on the location signal of an ad response, either lat/lon or IP address then converted into lat/lon, falling within an ad campaign's intended geotargeted area. In an aspect, the value representing the in-geo is determined by comparing a location signal to the intended geotargeted area of an ad campaign. The value representing the confidence or credibility of the signal is determined based on a measure of the reliability of targeting and non-fraudulent data, for example within the US, within geotargeting, non-centroid, and/or passes fraudulent checks. Additionally, or alternatively, the value representing the confidence of the signal is determined based on a reliability of a location signal's capability to properly target a defined area. In an aspect, the value representing the credibility is based on the frequency of fraudulent location signal data present in an ad call. Finally, the value representing the precision or credibility of the signal is determined based on a measure of at least one of the exactness of the location signal, for example, lat/lon data with "sweet spot" precision with 4-6 decimals, or a probability of fraudulent activity. In an aspect, the value representing the confidence is based on how the location signals aligns with an ad campaign's geotargeting specifications.

In an aspect, the location quality score "LQS" is calculated based on the average of the determined accuracy or in-geo value, the determined precision or credibility value, and the determined confidence value. In an aspect, the "LQS" is based on a median average. Alternatively, in an aspect the "LQS" is based on a weighted average of the determined in-geo value, the determined credibility value, and the determined confidence value. For example, in one aspect, the determined in-geo value is provided a weight of 50%, the determined credibility value is provided a weight of 30%, and the determined confidence value is provided a weight of 20% and the location quality score "LQS" is calculated based on a weighted average of these values.

The final calculated location quality score "LQS", calculated by system 100, is utilized in the system's 100 reporting and may be used for determining whether an impression, content, or ad was served within specified geotargeted locations. For example, in an aspect, system 100 determines and confirms that an impression, content, or ad was served within specified geotargeted locations when the location quality score "LQS" exceeds a preconfigured threshold. Additionally, system 100 determines and confirms that an impression, content, or ad was not served within specified geotargeted locations when the location quality score "LQS" falls below a preconfigured threshold. Additionally, or alternatively, other factors may be considered by system 100 for determining whether an impression, content, or ad was served within specified geotargeted locations and the location quality score "LQS" may be may be just one factor is making the determination.

Figure 4:
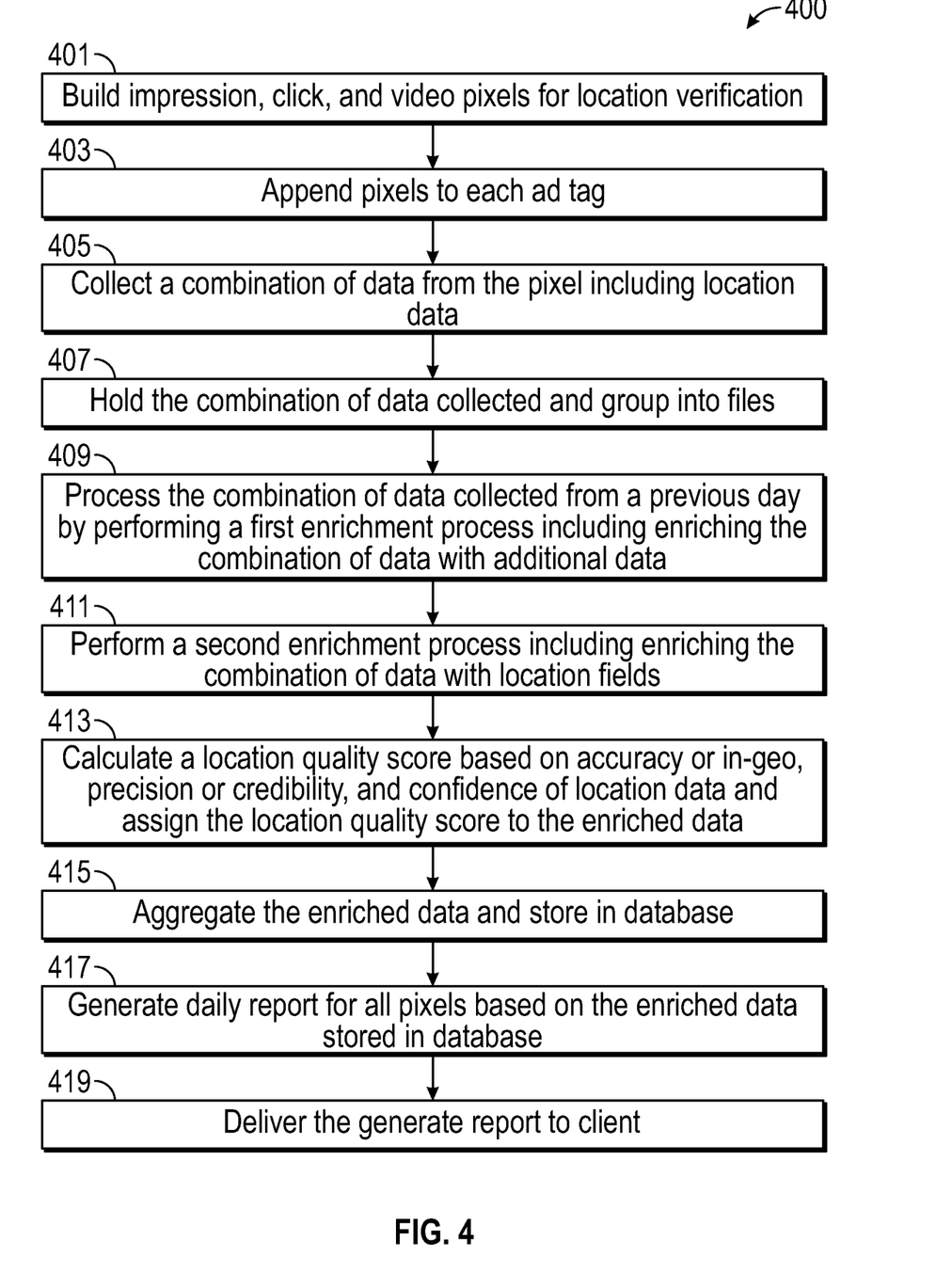
FIG. 4 is a flowchart illustrating a method for enhanced location verification and content delivery confirmation in accordance with the instant disclosure.

Referring now to FIG. 4, a method for enhanced location verification and content delivery confirmation will be described and referred to as method 400. Although the methods illustrated and described herein are illustrated and described as being in a particular order and requiring particular steps, any of the methods may include some or all of the steps and may be implemented in any order. Additionally, any or all of the steps of any of the methods described herein may be carried out by data collection server 104 (e.g., a computing device) of system 100 or any other component or combination of components of system 100 and/or data collection server 104.

Method 400 begins at step 401 where a customized pixel for location verification is built. The customized pixel may be an impression, click, and/or video pixel. The customized pixel may be built by an end user or customized by system 100 to meet a user's need. In step 403, the customized pixel built in step 401 is appended to an ad tag. For example, campaign information (start/end dates, targeting criteria, inventory sources) are stored on the data collection server 104 and data collection server 104 generates a unique pixel with appropriate ad server macro placeholders. A client may append the generated pixel with macros to capture relevant pieces of information and data to campaign ad tags including for example, device identification information, lat/lon data, IP address, inventory source, and/or publisher identification data. Data collection server 104 may additionally verify that data from all inventory sources is received in a usable manner, reducing the potential for errors during delivery or at other times.

In step 405, the data collection server 104 collects a combination of data from the pixel including at least location data. In step 407, the data collection server 104 holds the combination of data collected and groups the combination of data into files. For example, as described below, data captured from the pixel is processed by data collection server 104 daily at per-impression level and in the reporting the per-impression data is processed and aggregated by inventory source and publisher.

In step 409, the data collection server 104 processes the combination of data collected from a previous day and enriches the data. In an aspect, step 409 includes performing a first enrichment process including enriching the combination of data with additional data corresponding to at least one of connection type, ISP, or lat/lon data based on IP in a case where lat/lon data was not provided by other means.

Following the first enrichment process, in step 411, the data collection server 104 performs a second enrichment process. The second enrichment process includes enriching the combination of data with location data fields. The location data fields may include, for example, at least one of country, zip, designated market area, brand category, state, city, income, population density, ethnicity, location category, address, or political affiliation.

In step 413, the data collection server 104 generates and assigns a location quality score to the enriched data. The location quality score generated by the data collection server 104 is based on at least one of an accuracy or in-geo, a precision or credibility, and a confidence of the location data. In an aspect, as described above, a value representing the accuracy or in-geo of the data (e.g., signal), a value representing the precision or credibility of the data (e.g., signal), a value representing the confidence of the data (e.g., signal), and a location quality score "LQS", are all calculated by system 100. The value representing the accuracy or in-geo of the signal is determined based on a measure of the location signal type. The accuracy or in-geo value may be corresponding to supplied lat/lon data or supplied noncellular IP data. The value representing the confidence of the signal is determined based on a measure of the reliability of targeting and non-fraudulent data. Additionally, or alternatively, the value representing the confidence of the signal is determined based on a reliability of a location signal's capability to properly target a defined area. The confidence value may be corresponding to fraudulent checks. Finally, the value representing the precision or credibility of the signal is determined based on a measure of at least one of the exactness of the location signal or a probability of fraudulent activity. The precision or credibility value may correspond to a lat/lon data "sweet spot" precision or credibility with 4-6 decimals.

In an aspect, the value representing in-geo is determined based on the location signal of an ad response, either lat/lon or IP address then converted into lat/lon, falling within an ad campaign's intended geotargeted area. The value representing the credibility of the signal is determined based on a measure of the reliability of targeting and non-fraudulent data, for example within the US, within geotargeting, non-centroid, and/or passes fraudulent checks. Finally, the value representing the confidence of the signal is determined based on how a location signal type aligns with capabilities of targeting a defined geotargeted area.

In an aspect, in step 413, the location quality score "LQS" is calculated based on the average of the determined accuracy or in-geo value, the determined precision or credibility value, and the determined confidence value. Though described as factoring the average of the three signal values (accuracy or in-geo, precision or credibility, and confidence), it is contemplated that the location quality score calculated and assigned in step 413, may factor other characteristics of data and location signals when calculating the location quality signal. In step 413, the "LQS" may be calculated using a median average or a weighted average of the above-described metric values determined (e.g., in-geo, credibility, and confidence).

In step 415, the enriched data is aggregated and stored in a database. In step 417, data collection server 104 generates a daily report for all of the pixels based on, and including, the enriched data stored in the database in step 415. In step 419, data collection server 104 delivers the report generated in step 417 to a client for review.

Figure 6:
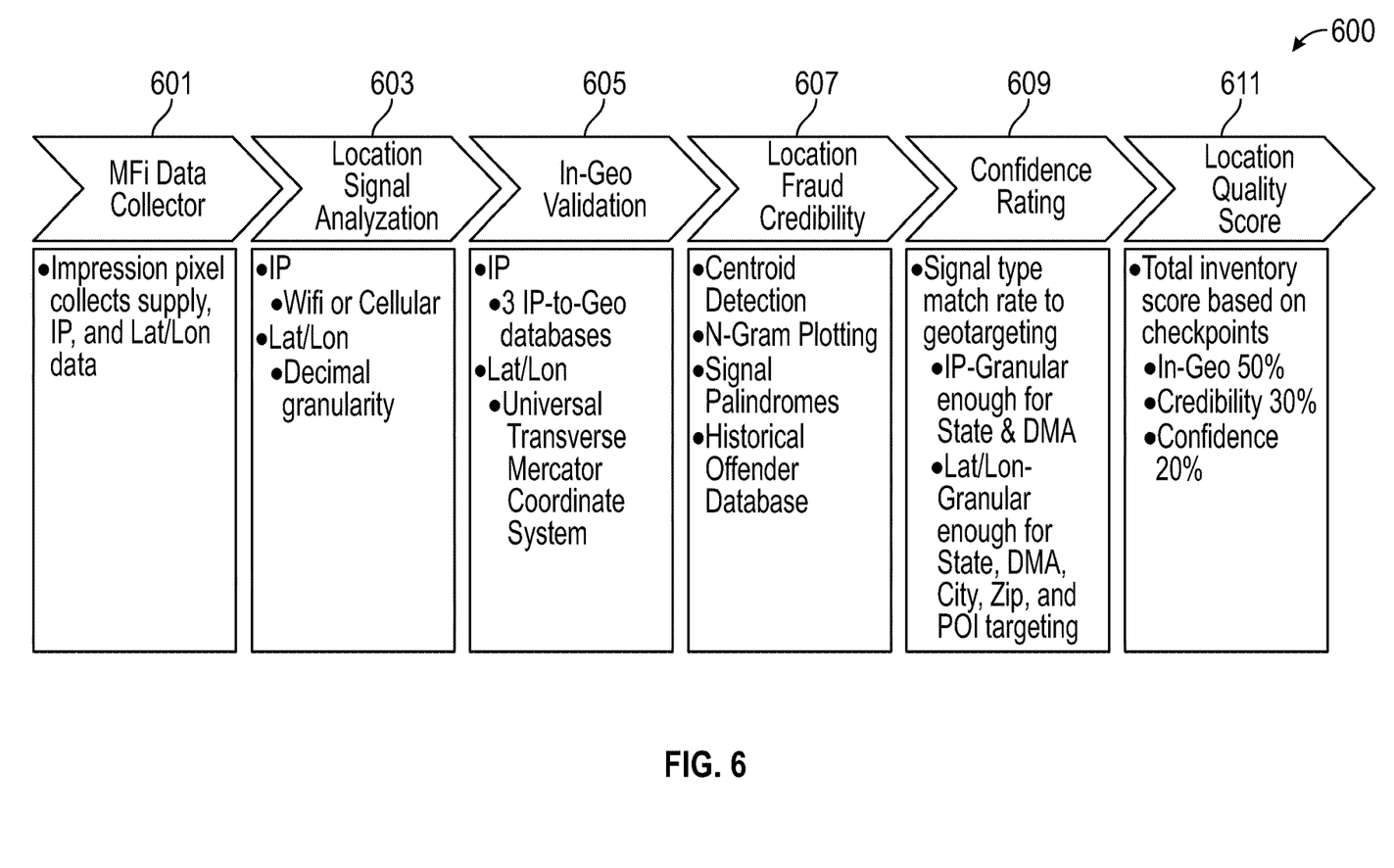
FIG. 6 is a flowchart illustrating a method for enhanced location verification and content delivery confirmation in accordance with the instant disclosure.

Turning now to FIG. 6, a method for enhanced location verification and content delivery confirmation in accordance with the instant disclosure is described generally as method 600. Method 600 begins at step 601 where data is collected. The data collected in step 601 is derived from the impression pixel which supplies IP and latitude and longitude data. In step 603, a step of location signal analysis is performed which includes the IP data (Wi-Fi or cellular) and latitude and longitude data (decimal granularity). In step 605, a step of in-geo validation is performed which considers three IP-to-geo databases, latitude and longitude data, and Universal Transverse Mercator Coordinate System. In step 607, a step of location fraud credibility is performed, which includes centroid detection, N-gram plotting, signal palindromes, and a historical offender database. In step 609, a confidence rating is performed which includes a signal type match rate to geotargeting, IP (granular enough for state and DMA, and latitude and longitude data (which is granular enough for state, DMA, city, zip, and POI targeting. In step 611, a location quality score "LQS" is generated. As described above, the location quality score is based on total inventory score based on checkpoints, with a weighted average of in-geo, credibility, and confidence. For example, in step 611, the location quality score may be calculated based on a 50% weight applied for the determined in-geo, 30% weight applied for the determined credibility, and a 20% weight applied for the determined confidence.

Figure 5A:
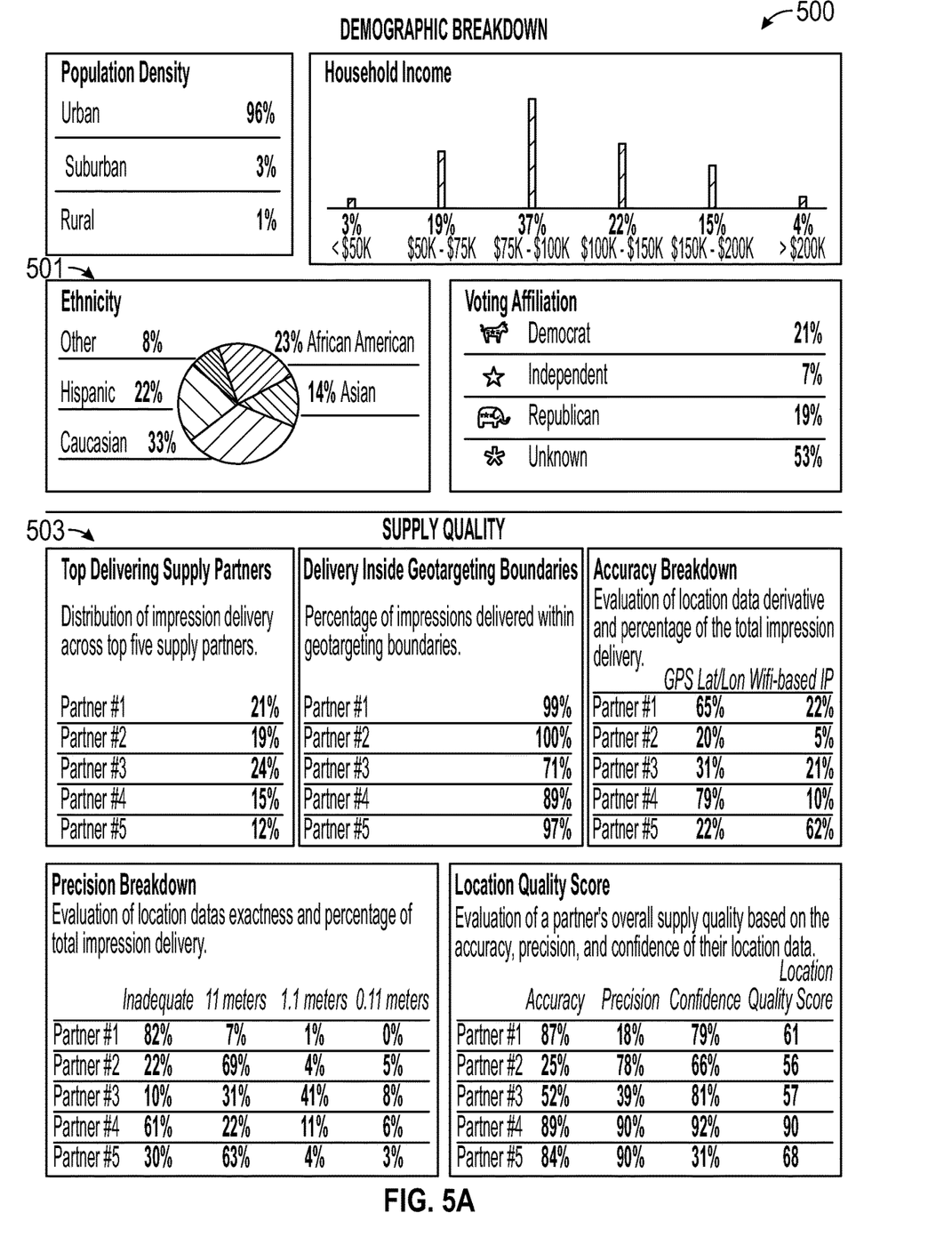
FIG. 5A is an illustration of a sample daily report generated by the system of FIG. 1.
Figure 5B:
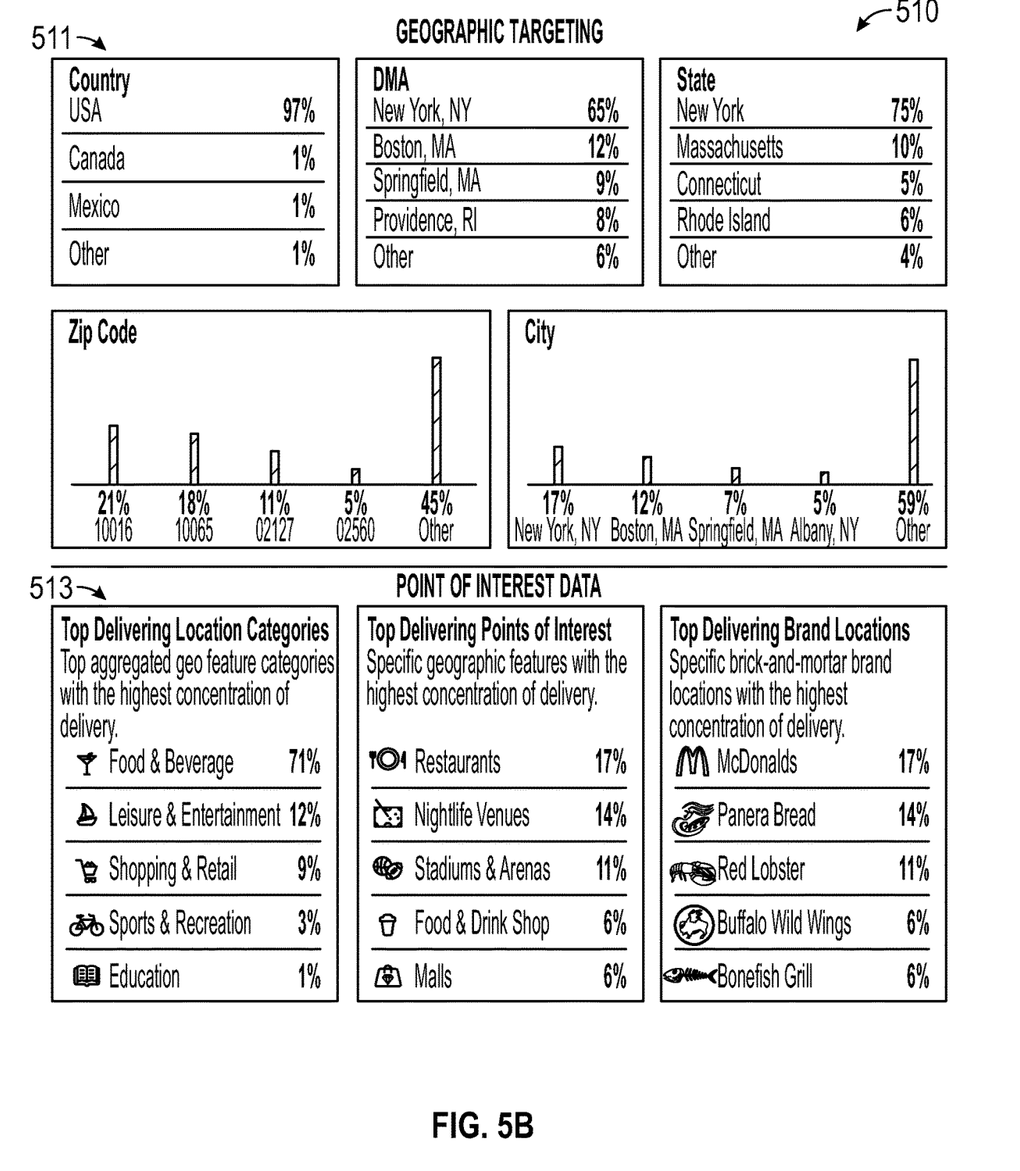
FIG. 5B is an illustration of a sample weekly report generated by the system of FIG. 1.

With additional reference now to FIGS. 5A-5B, exemplary reports 500 and 510 generated by system 100 are illustrated and will now be described. Reports 500 and 510 may be delivered or otherwise included in a graphical user interface for display on remote devices 110 and/or any other component of system 100 such as data collection server 104, or other components that are not a part of system 100 explicitly (for example client or end user computing devices).

Report 500 includes a demographic breakdown section 501 which includes data relating to population density, household income, ethnicity, and voting affiliation. Report 500 additionally includes a supply quality section 503 which includes data relating to top delivering supply partners, delivery inside geotargeting boundaries, accuracy or in-geo breakdown, precision or credibility breakdown, and location quality score calculated by system 100. Report 510 includes a geographic targeting section including data relating to country, designated market area, state, zip code, and city. Report 510 additionally includes a point of interest data section 513 including data relating to top delivering location categories, top delivering point of interest, and top delivering brand locations.

For the daily reporting by system 100, the output is analyzed and aggregated to determine if an impression was served within specified geotargeting. In an aspect, data is automatically emailed, or otherwise delivered, in an excel file (for example, daily), providing an overall summary of delivery and a publisher breakdown by supply score.

For the final reporting by the system 100 (for example, report 510 in FIG. 5B), the input is analyzed and aggregated to determine if an impression was served within specified geotargeting. In an aspect, the data is aggregated and a formatted PDF report and/or spreadsheet is generated (for example, within ten days of a campaign end). In an aspect, the data is aggregated and a spreadsheet is automatically generated (for example, every seven days while a campaign is live).

In an aspect, system 100 generates three types of unique location reporting in the form of a daily optimization report, a weekly geographic report, and a final insight report. The daily optimization report is broken down of location signal quality by partner and publisher, and provides performance indicators. The performance indicators are utilized to provide engagement and/or publisher data correlated to location signals. The weekly geographic report is a breakdown of geographic delivery and performance by partner, and is optimizable data for shifting a budget towards better performing locations. The final insight report (for example report 510 of FIG. 5B) is a full campaign breakdown of geographic distribution, Pitney Bowes POI data, census demographic insights, and supply partnership evaluations.

For any or all of the reporting by system 100, the output may be analyzed and aggregated to determine if an impression was served within specified geotargeting. As described above, in an aspect, data is automatically emailed, or otherwise delivered, in an excel file (for example, daily), providing an overall summary of delivery and a publisher breakdown by supply score.

The location verification signal may be based on a GPS signal alone, other location data signals, or a combination of GPS signals and other location data signals. In an aspect, this signal is specifically focused on lat/lon data and Wi-Fi-based IP signals. As described above, the system 100 is integrated with other databases, such as the Pitney Bowes POI database, such that the system 100 may define specific locations of ad content viewing and ad content engagement. The specific location may be categorized for example as a location category or a brand category. Examples of location categories include fast food restaurant, school, residential building, etc. Examples of brand categories include McDonalds®, Burger King®, Wendy's®, etc. Additionally, as described above, government census data is utilized by system 100 and applied to records for additional audience insights.

What is claimed is:

1. A method for enhanced location verification and content delivery confirmation, the method comprising:
building a customized pixel for location verification;
appending the customized pixel to an ad tag;
collecting a combination of data from the customized pixel, the combination of data including location data;
holding the combination of data collected and grouping the held data into files;
processing the combination of data collected from a previous day by performing a first enrichment process, the first enrichment process including enriching the combination of data with additional data corresponding to at least one of connection type and latitude and longitude data, wherein latitude and longitude data is based on IP in a case where latitude and longitude information was not provided;

performing a second enrichment process including enriching the combination of data with location data fields including at least one of country, zip, or designated market area;

calculating a location quality score based on an accuracy or in-geo, a precision or credibility, and a confidence of location data;

assigning the location quality score calculated to the enriched data;

aggregating the enriched data and storing the enriched data in a database;

generating a daily report for all pixels based on the enriched data stored in the database; and delivering the generated daily report to a client.

2. The method of claim 1, wherein the first enrichment process further includes fixing a timestamp format, converting to CSV, and storing a log.

3. The method of claim 1, wherein the accuracy or in-geo of the location quality score is based on at least one of a type of location signal or whether a location signal matches an intended geotarget.

4. The method of claim 1, wherein the precision or credibility of the location quality score is based on at least one of an exactness of a location signal or a probability of fraudulent activity.

5. The method of claim 1, wherein the confidence of the location quality score is based on at least one of a reliability of targeting and non-fraudulent data or a reliability of a location signal's capability to properly target a defined area.

6. The method of claim 1, further comprising generating a daily optimization report including a breakdown of the location quality score by partner and publisher and performance indicators to provide engagement data correlated to location signals.

7. The method of claim 1, further comprising generating a weekly geographic report including a breakdown of geographic delivery and performance by partner and optimizable data for shifting a budget towards better performing locations.

8. The method of claim 1, further comprising generating a final insight report including a full campaign breakdown of geographic distribution, Pitney Bowes POI data, census demographic insights, and supply partnership evaluations.

9. A system for enhanced location verification and content delivery confirmation including a computing device configured to:

build a customized pixel for location verification;

append the customized pixel to an ad tag;

collect a combination of data from the customized pixel, the combination of data including location data;

hold the combination of data collected and group the held data into files;

process the combination of data collected from a previous day by performing a first enrichment process, the first enrichment process including enriching the combination of data with additional data corresponding to at least one of connection type and latitude and longitude data, wherein latitude and longitude data is based on IP in a case where latitude and longitude information was not provided;

perform a second enrichment process including enriching the combination of data with location data fields including at least one of country, zip, or designated market area;

calculate a location quality score based on an accuracy or in-geo, a precision or credibility, and a confidence of location data;

assign the location quality score calculated to the enriched data;

aggregate the enriched data and store the enriched data in a database;

generate a daily report for all pixels based on the enriched data stored in the database; and deliver the generated daily report to a client.

10. The system of claim 9, wherein the first enrichment process further includes fixing a timestamp format, converting to CSV, and storing a log.

11. The system of claim 9, wherein the accuracy or in-geo of the location quality score is based on at least one of a type of location signal or whether a location signal matches an intended geotarget.

12. The system of claim 9, wherein the precision or credibility of the location quality score is based on at least one of an exactness of a location signal or a probability of fraudulent activity.

13. The system of claim 9, wherein the confidence of the location quality score is based on at least one of a reliability of targeting and non-fraudulent data or a reliability of a location signal's capability to properly target a defined area.

14. The system of claim 9, wherein the computing device is further configured to generate a daily optimization report including a breakdown of the location quality score by partner and publisher and performance indicators to provide engagement data correlated to location signals.

15. The system of claim 9, wherein the computing device is further configured to generate a weekly geographic report including a breakdown of geographic delivery and performance by partner and optimizable data for shifting a budget towards better performing locations.

16. The system of claim 9, wherein the computing device is further configured to generate a final insight report including a full campaign breakdown of geographic distribution, Pitney Bowes POI data, census demographic insights, and supply partnership evaluations.

17. A non-transitory computer-readable storage medium storing a program which, when executed by a computer, causes the computer to perform a method for enhanced location verification and content delivery confirmation, the method comprising:

building a customized pixel for location verification;

appending the customized pixel to an ad tag;

collecting a combination of data from the customized pixel, the combination of data including location data;

holding the combination of data collected and grouping the held data into files;

processing the combination of data collected from a previous day by performing a first enrichment process, the first enrichment process including enriching the combination of data with additional data corresponding to at least one of connection type and latitude and longitude data, wherein latitude and longitude data is based on IP in a case where latitude and longitude information was not provided;

performing a second enrichment process including enriching the combination of data with location data fields including at least one of country, zip, or designated market area;

calculating a location quality score based on an accuracy or in-geo, a precision or credibility, and a confidence of location data;

assigning the location quality score calculated to the enriched data;

aggregating the enriched data and storing the enriched data in a database;

generating a daily report for all pixels based on the enriched data stored in the database; and delivering the generated daily report to a client.

18. The non-transitory computer-readable storage medium of claim 17, wherein the accuracy or in-geo of the location quality score is based on at least one of a type of location signal or whether a location signal matches an intended geotarget.

19. The non-transitory computer-readable storage medium of claim 17, wherein the precision or credibility of the location quality score is based on at least one of an exactness of a location signal or a probability of fraudulent activity.

20. The non-transitory computer-readable storage medium of claim 17, wherein the confidence of the location quality score is based on at least one of a reliability of targeting and non-fraudulent data or a reliability of a location signal's capability to properly target a defined area.

* * * * *